United States Patent
Ohta et al.

(10) Patent No.: US 7,001,935 B2
(45) Date of Patent: Feb. 21, 2006

(54) INK FOR INK JET PRINTING PROCESS AND PRINTED MATTER OBTAINED USING THE SAME

(75) Inventors: Hitoshi Ohta, Nagano-ken (JP); Hidehiko Komatsu, Nagano-ken (JP); Masahiro Yatake, Nagano-ken (JP); Kazuhiko Hara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 132 days.

(21) Appl. No.: 10/094,937

(22) Filed: Mar. 11, 2002

(65) Prior Publication Data

US 2002/0198287 A1    Dec. 26, 2002

(30) Foreign Application Priority Data

Mar. 12, 2001 (JP) .......................... P.2000-069336
Dec. 28, 2001 (JP) .......................... P.2001-401235

(51) Int. Cl.
*C09D 11/10* (2006.01)
*C08L 81/00* (2006.01)

(52) U.S. Cl. ...................................... 523/160; 524/609

(58) Field of Classification Search ................ 523/160, 523/161; 524/609; 106/31.6, 31.85
See application file for complete search history.

(56) References Cited

U.S. PATENT DOCUMENTS

| | | | | | |
|---|---|---|---|---|---|
| 4,597,794 A | * | 7/1986 | Ohta et al. | .................. | 347/100 |
| 5,977,207 A | * | 11/1999 | Yui et al. | .................... | 523/160 |
| 6,051,645 A | * | 4/2000 | Suzuki et al. | ............... | 524/500 |
| 6,368,397 B1 | * | 4/2002 | Ichizawa et al. | ......... | 106/31.65 |
| 6,378,999 B1 | * | 4/2002 | Doi et al. | .................. | 347/100 |
| 6,613,136 B1 | * | 9/2003 | Arita et al. | .............. | 106/31.58 |

FOREIGN PATENT DOCUMENTS

| | | | |
|---|---|---|---|
| EP | 834537 A1 | * | 4/1998 |
| EP | 851005 A2 | * | 7/1998 |
| EP | 978547 A1 | * | 2/2000 |
| JP | 10110129 | | 4/1998 |
| JP | 1149974 | | 2/1999 |
| JP | 11217525 A | * | 8/1999 |

OTHER PUBLICATIONS

English Tranlsation of JP 11217525 A (1999).*

* cited by examiner

*Primary Examiner*—Callie Shosho
(74) *Attorney, Agent, or Firm*—Ladas & Parry LLP

(57) ABSTRACT

An ink for ink jet printing process, comprising at least: a particulate pigment having a sulfur-containing dispersibility-imparting group on the surface thereof; a penetrating agent; a resin emulsion comprising a dispersed particulate resin having a sulfur-containing dispersibility-imparting group on the surface thereof; and water.

14 Claims, No Drawings

INK FOR INK JET PRINTING PROCESS AND PRINTED MATTER OBTAINED USING THE SAME

FIELD OF THE INVENTION

The present invention relates to an aqueous ink which can be used as an ink for ink jet printing process and a printed matter obtained using the same.

BACKGROUND OF THE INVENTION

In recent years, the ink for ink jet printing process has been required to give a printed image excellent in fastness such as water resistance and light-resistance and be free from disadvantages, e.g., irregular ink flow and expansion of ink droplets attached to the printing medium (hereinafter referred to as "blurring") regardless of the kind of printing medium.

To this end, it has been considered to use a pigment having an excellent fastness instead of dye for the purpose of providing printed images with desired fastness. Unlike dyes, pigments cannot be dissolved in water. Thus, it is necessary that a pigment be finely dispersed in water. However, it is very difficult to keep the pigment dispersed in water in a stable manner. In order to solve this problem, various techniques for dispersing a pigment in water in a stable manner have been proposed. As one of these techniques there is known a technique involving the incorporation of sulfonic acid groups into the surface of pigment particles.

For example, Japanese Patent Laid-Open No. 1998-110129 discloses an ink for ink jet printing process comprising a "sulfonated surface-treated organic pigment" obtained by treating an organic pigment dispersed in a solvent free of active proton with a sulfonating agent. In accordance with this approach, the ink for ink jet printing process has a stable dispersibility and thus can be ejected from the nozzle in a stable manner. Further, Japanese Patent Laid-Open No. 1999-49974 discloses that an organic pigment mass having a sulfonic acid group incorporated therein is treated with a monovalent metal ion to prepare an organic pigment mass which can be positively charged on the surface thereof. This document also discloses an aqueous ink composition having an excellent storage stability comprising a pigment emulsion prepared from the positively surface-charged organic pigment mass, a dispersant and water.

The aforementioned related art techniques have the following disadvantages.

Specifically, the pigment having a sulfonic acid group incorporated therein disclosed in the above cited Japanese Patent Laid-Open No. 1998-110129 and Japanese Patent Laid-Open No. 1999-49974 is free of fixing component on the surface thereof and thus is disadvantageous in that the resulting printed image exhibits deteriorated friction resistance. Thus, Japanese Patent Laid-Open No. 1998-110129 discloses that the fixability of the printed image can be improved by the addition of a water-soluble resin.

However, the ink having the formulation disclosed in Japanese Patent Laid-Open No. 1998-110129 exhibits a poor penetrating power when printed on a special printing medium (e.g., glossy paper, glossy film sheet) which is used for the case where an image having a quality as high as or higher than color photograph is required. As a result, the liquid component in the ink penetrates little into the printing medium, leaving the pigment particles behind on the surface of the printing medium. Thus, the resulting printed image loses surface smoothness and lacks gloss, impairing the print quality and friction resistance. Further, ink blurring occurs on the area where two or more color inks are imposed on each other or come in contact with each other, particularly upon full-color printing.

SUMMARY OF THE INVENTION

It is therefore an object of the invention to realize an ink for ink jet printing process, which can solve the foregoing problems of the related art.

Other objects and effects of the invention will become apparent from the following description.

The inventors made extensive studies of solution to the foregoing problems of the related art. As a result, it was found that the addition of a specific penetrating agent and a specific resin emulsion (resin emulsion substantially insoluble in the ink) to an ink comprising a particulate pigment having a sulfur-containing dispersibility-imparting group on the surface thereof makes it possible to realize an ink for ink jet printing process, which can solve the foregoing problems of the related art. Thus, the invention has been proposed.

That is, the above-described objects of the present invention have been achieved by providing an ink for ink jet printing process, comprising at least:

a particulate pigment having a sulfur-containing dispersibility-imparting group on the surface thereof;

a penetrating agent;

a resin emulsion comprising a dispersed particulate resin having a sulfur-containing dispersibility-imparting group on the surface thereof; and water.

In a preferred embodiment of the ink for ink jet printing process of the invention, the molecular skeleton of the resin constituting said resin emulsion is (A) a styrene-(meth) acrylic acid copolymer or (B) a diene (co) polymer.

In another preferred embodiment of the ink for ink jet printing process of the invention, the particulate resin constituting the resin emulsion has —SO$_3$M and/or —RSO$_2$M (wherein M represents a counter ion such as hydrogen ion, alkaline metal ion, ammonium ion and organic ammonium ion) chemically bonded to the surface thereof to render itself dispersible in water.

In a still other preferred embodiment of the ink for ink jet printing process of the invention, the lowest film-making temperature of the resin emulsion is not higher than 30° C.

In a still other preferred embodiment of the ink for ink jet printing process of the invention, the pigment comprises a carbon black pigment and/or an organic pigment and, preferably, the particulate pigment has been subjected to surface treatment with a treating agent containing sulfur so that it has —SO$_3$M and/or —RSO$_2$M (wherein M represents a counter ion such as hydrogen ion, alkaline metal ion, ammonium ion and organic ammonium ion) chemically bonded to the surface thereof to render itself dispersible and/or soluble in water.

In a still other preferred embodiment of the ink for ink jet printing process of the invention, the penetrating agent comprises at least one compound selected from the group consisting of acetylene glycol-based surface active agents, acetylene alcohol-based surface active agents, glycol ethers, 1,2-alkylene glycols and compounds having a structure represented by the following general formula (I):

R—EO$_n$—PO$_m$—X            (I)

wherein R represents a $C_1$–$C_{12}$ alkyl group which may be straight-chain or branched; X represents —H or —$SO_3M$ (wherein M represents a counter ion such as hydrogen ion, alkaline metal ion, ammonium ion and organic ammonium ion); EO represents an ethyleneoxy group; PO represents a propyleneoxy group; and n and m each represent the number of the respective repeating units averaged over the entire system, with the proviso that EO and PO in formula (I) are intended to merely show the presence thereof in the molecule and hence their order of arrangement is not limited to that shown.

In a still other preferred embodiment of the ink for ink jet printing process of the invention, the weight-average molecular weight of the compound represented by the general formula (I) is not greater than 2,000 and R in the general formula (I) is a $C_4$–$C_{10}$ alkyl group.

Further, the present invention also provides a printed matter obtained by printing with the aforementioned ink for ink jet printing process.

The term "liquid component of ink" as used herein means the liquid portion when an ink for ink jet printing process is divided into a solid portion such as particulate pigment and a liquid portion dispersing and holding the solid portion.

DETAILED DESCRIPTION OF THE INVENTION

<Ink for Ink Jet Printing Process>

The ink for ink jet printing process of the invention comprises at least a particulate pigment having a sulfur-containing dispersibility-imparting group on the surface thereof (hereinafter occasionally simply referred to as "surface-treated particulate pigment"), a penetrating agent, a resin emulsion comprising a dispersed particulate resin having a sulfur-containing dispersibility-imparting group on the surface thereof and water. Printing with such an ink makes it possible to realize a printed image which undergoes little blurring and exhibits excellent fixability and gloss regardless of the kind of the printing medium. The reason for this effect is unknown yet but can be presumed as follows.

Specifically, the surface-treated particulate pigment is dispersed in the ink in a stable manner because the sulfur-containing dispersibility-imparting group undergoes ionic dissociation to cause mutual electrostatic repulsion between the particles. However, when the ink adheres to the printing medium, ionic materials such as alkaline earth metal ion (e.g., magnesium ion, calcium ion) in the printing medium are eluted with the ink, causing salting-out reaction of the aforementioned sulfur-containing dispersibility-imparting group (particularly sulfinic acid group or sulfonic acid group) with the aforementioned ionic materials resulting in the bonding thereof. The resulting agglomeration of the pigment particles causes the separation of the pigment particles from the liquid component in the ink. As a result, the agglomerated pigment particles are sedimented on and adsorbed to the surface of the printing medium. Thereafter, the liquid component penetrates and diffuses in the surface and interior of the printing medium. Therefore, a printed image having little blurring can be obtained. Further, the printed matter thus obtained exhibits difficulty in dissolution close to the water solubility of sulfates and thus exhibits a higher water resistance than pigment ink comprising an ordinary dispersant (e.g., surface active agent type, alkali-neutralized resin-dispersed) incorporated therein.

When printed particularly on a printing medium (e.g., gloss paper, gloss film sheet), the surface-treated particulate pigment remains on the surface because it is free of component for fixing it to the printing medium. Thus, the resulting matter exhibits deteriorated friction resistance. Further, the surface of the printed matter is formed by the agglomerated pigment particles and thus lacks smoothness, giving an image with insufficient gloss. The inventors made an extensive study of this problem. As a result, it was found that the incorporation, in the ink (liquid component), of at least one compound selected from the group consisting of acetylene glycol-based surface active agents, acetylene alcohol-based surface active agents, glycol ethers, 1,2-alkylene glycols and compounds having a specific structure, as penetrating agent(s), and a resin emulsion comprising a dispersed particulate resin having a sulfur-containing dispersibility-imparting group on the surface thereof makes it possible to improve the friction resistance and gloss of the printed matter.

The aforementioned resin emulsion has a sulfur-containing dispersibility-imparting group on the surface of the constituting particulate resin, similarly to the aforementioned particulate pigment. The resin emulsion undergoes ionic dissociation in the ink that causes mutual electrostatic repulsion between the particles. Further, since the sulfur-containing dispersibility-imparting group provided on the surface of the resin emulsion is similar to that provided on the surface of the particulate pigment, the resin emulsion is stably dispersed kept in little or no mutual interaction with the particulate pigment.

The inventors confirmed that the dispersion stability of the ink is better than that of an ink comprising an emulsion of a resin having, e.g., a carboxyl group on the surface thereof. In some detail, under some conditions (e.g., during storage at high temperatures), the ink comprising a carboxyl group-containing resin emulsion may undergo thickening, granulation, etc. The reason for this phenomenon is unknown. However, this is presumably because when the dispersibility-imparting group of the particulate pigment and the resin emulsion are different from each other, the two components have different dissociation constants, causing some mutual interaction.

When the ink of the invention adheres to the printing medium, the resin emulsion undergoes salting-out reaction with the ionic materials in the printing medium similarly to the aforementioned particulate pigment and then undergoes agglomeration and sedimentation together with the particulate pigment so that it is present between the pigment particles and the liquid component thus separated penetrates and diffuses in the printing medium. Since the resin emulsion is present between the pigment particles, the film formation of the resin emulsion is accompanied by the strong adhesion of the pigment particles to each other with the resin. Further, since while the ink is drying, the penetrating agent in the liquid component penetrates and diffuses into the printing medium together with a part of the resin emulsion, the particulate pigment firmly adheres to the printing medium with the resin. The resulting image exhibits an excellent friction resistance. Moreover, since the resin emulsion forms a film around the pigment particles to provide the image with smoothness, the resulting image exhibits an excellent gloss.

The particulate pigment to be incorporated in the ink for ink jet printing process exhibits excellent dispersion stability because the sulfur-containing dispersibility-imparting group is not separated from the surface of the pigment. Therefore, the penetrating agent, the amount of which is restricted to keep its dispersion stability in the conventional resin-dispersed pigment, can be added in an amount such that the desired penetrating power can be attained. Accordingly, the ink of the invention causes little blurring even on the image area where two or more color inks are imposed particularly in full-color printing process, making it possible to provide a sharp image.

The constituent elements of the ink for ink jet printing process of the invention will be further described hereinafter.

<Particulate Pigment>

The ink for ink jet printing process of the invention comprises a particulate pigment having a sulfur-containing dispersibility-imparting group on the surface thereof. The pigment constituting the particulate pigment is not specifically limited so far as it can support a sulfur-containing dispersibility-imparting group on its surface and cannot be dissolved in the sulfur-containing treating agent to be used in the incorporation of the dispersibility-imparting group. From this standpoint of view, there may be exemplified the following pigments as pigments which can be particularly preferably incorporated in the ink for ink jet printing process of the invention.

Examples of inorganic black pigments employable herein include carbon black (C.I. pigment black 7) such as furnace black, lamp black, acetylene black and channel black, and iron oxide pigments.

Examples of pigments which can be used mainly as yellow pigments include C.I. pigment yellow 1 (Hanza Yellow), 3 (Hanza Yellow 10G), 12, 13, 14, 17, 24 (Flavanthrone Yellow), 34, 35, 37, 53, 55, 65, 73, 74, 81, 83, 93, 94, 95, 97, 98, 99, 108 (Anthrapyrimidine Yellow), 109, 110, 113, 117 (copper complex salt pigment), 120, 128, 133 (Quinophthalone Yellow), 138, 139 (Isoindolinone), 147, 151, 153 (nickel complex pigment), 154, 167, 172 and 180.

Examples of magenta pigments employable herein include C.I. pigment red 1 (Para Red), 2, 3 (Toluidine Red), 5 (ITR Red), 7, 9, 10, 11, 12, 17, 30, 31, 38 (Pyrazolone Red), 42, 88 (Thioindigo), 112 (Naphthol AS), 114 (Naphthol AS), 122 (Dimethyl Quinacridone), 123, 144, 149, 150, 166, 168 (Anthanthrone Orange), 170 (Naphthol AS), 171, 175, 176, 177, 178, 179 (Perylene Maroon), 185, 187, 202 (Quinacridone Magenta), 209 (Dichloroquinacridone), 219, 224 (Perylene) and 245 (Naphthol AS), and C.I. pigment violet 19 (Quinacridone), 23 (Dioxazine Violet), 32, 33, 36, 38, 43 and 50.

Examples of cyan pigments employable herein include C.I. pigment blue 15, 15:1, 15:2, 15:3, 15:4, 15:5, 15:6, 16 (metal-free Phthalocyanine), 18 (Alkali Blue Toner), 25, 60 (Threne Blue), 65 (Violanthrone) and 66 (Indigo).

As organic black pigments there may be used organic black pigments such as Aniline Black (C.I. pigment black 1).

Further examples of organic pigments other than magenta, cyan and yellow pigments include C.I. pigment green 7 (Phthalocyanine Green), 10 (Green Gold), 36 and 37, C.I. pigment brown 3, 5, 25 and 26, and C.I. pigment orange 1, 2, 5, 7, 13, 15, 16, 34, 36 and 38.

The ink for ink jet printing process of the invention may comprise the aforementioned pigments incorporated therein singly or in combination of two or more thereof.

The sulfur-containing dispersibility-imparting group to be supported on the surface of the particulate pigment to be contained in the ink for ink jet printing process of the invention is not specifically limited so far as it is a functional group which contains sulfur atom and imparts water dispersibility to the pigment. Preferred examples of the sulfur-containing dispersibility-imparting group include sulfinic acid ($-RSO_2^-$) and sulfonic acid ($-SO_3^-$) group. In the particulate pigment to be incorporated in the ink for ink jet printing process of the invention, the aforementioned dispersibility-imparting group should be present at least on the surface thereof, and it may be also present in the interior of the particles.

The particulate pigment having a sulfur-containing dispersibility-imparting group on the surface thereof to be incorporated in the ink for ink jet printing process of the invention may be prepared from the aforementioned pigment compounds by a known method. The particulate pigment having a sulfur-containing dispersibility-imparting group on the surface thereof can be obtained in the form of an aqueous dispersion prepared by the method described in Japanese Patent Laid-Open No. 1996-283596, Japanese Patent Laid-Open No. 1999-110110, Japanese Patent Laid-Open No. 1999-110111, and Japanese Patent Laid-Open No. 1999-110114.

An example of the method for the preparation of the aqueous dispersion of particulate pigment having a sulfur-containing dispersibility-imparting group on the surface thereof will be given below.

A finely particulate pigment is put in an aprotic solvent (e.g., N-methyl-2-pyrrolidone or sulfolane) in an amount of from 3 to 200 times by weight that of the pigment. The pigment is then treated with a sulfonating agent while being subjected to dispersion. Examples of the sulfonating agent employable herein include sulfonated pyridine, sulfamic acid, amidesulfuric acid, fluorosulfuric acid, chlorosulfuric acid, sulfur trioxide, fuming sulfuric acid, and sulfuric acid. These sulfonating agents may be used singly or in combination of two or more thereof. The treatment with such a sulfonating agent may be effected under heating (to a temperature of from about 60° C. to 200° C.) with stirring. Heating may be effected before or after the addition of the sulfonating agent.

The treatment with the sulfonating agent is followed by the removal of the aprotic solvent and the remaining sulfonating agent from the pigment slurry thus obtained. The removal of the aprotic solvent and the remaining sulfonating agent may be accomplished by the repetition of rinsing, ultrafiltration, osmosis, centrifugal separation, and/or filtration.

Subsequently, the sulfonated pigment is added to an aqueous liquid (particularly ion-exchanged water or distilled water) in a concentration of from about 10 to 40% by weight. The sulfonated pigment may be optionally subjected to ordinary dispersion for a short period of time to obtain an aqueous pigment dispersion without being subjected to drying step.

The amount of the aforementioned dispersibility-imparting group to be incorporated in the ink for ink jet printing process of the invention is preferably not smaller than $10 \times 10^{-6}$ equivalents per g of particulate pigment. When the amount of the dispersibility-imparting group to be incorporated falls below $10 \times 10^{-6}$ equivalents per g of particulate pigment, it not only deteriorates the storage stability of the ink but also reduces the print density, occasionally giving an image having much blurring. For the measurement of the amount of the dispersibility-imparting group to be incorporated, the aqueous dispersion of pigment is treated by oxygen flask combustion method, and then absorbed by an aqueous solution of hydrogen peroxide. The specimen is then determined for sulfuric acid ion (divalent) by ion chromatography. The measurements are then converted to sulfonic acid group and sulfinic acid group basis.

The average particle diameter of the pigment particles contained in the ink for ink jet printing process of the invention is preferably from 10 nm to 300 nm. When the average particle diameter of the pigment particles falls below 10 nm, the resulting ink can lose light-resistance. On the contrary, when the average particle diameter of the pigment particles exceeds 300 nm, the pigment particles can be sedimented, making it hard to attain stable ejection of the ink.

The content of the particulate pigment having a sulfur-containing dispersibility-imparting group on the surface thereof in the ink for ink jet printing process of the invention is preferably from 0.5 to 30% by weight. When the content of the particulate pigment falls below 0.5% by weight, the print density can be insufficient. On the contrary, when the content of the particulate pigment exceeds 30% by weight, the amount of organic solvent and other materials to be incorporated in the ink is restricted, occasionally causing the nozzle to be clogged or raising the viscosity of the ink. Thus, the resulting ink may be not ejected from the ink ejection nozzle in a stable manner.

<Resin Emulsion>

The resin emulsion comprising a dispersed particulate resin having a sulfur-containing dispersibility-imparting group on the surface thereof, to be incorporated in the ink for ink jet printing process of the invention, comprises a continuous phase formed by a liquid component such as water and a dispersed phase formed by fine particles made of the resin described below (fine particles substantially insoluble in the liquid component of the ink). This resin emulsion can be dispersed in the ink in a stable manner and exerts an effect of firmly bonding the pigment particles to each other and to the printing medium. The resin structure (resin molecular skeleton) constituting the resin emulsion is preferably (A) a styrene-(meth)acrylic acid copolymer or (B) a diene (co)polymer.

(A) Styrene-(meth)acrylic Acid Copolymer:

Specific examples of the resin structure having the aforementioned characteristics include styrene-(meth)acrylic acid copolymer, styrene-(meth)acrylic acid ester-(meth)acrylic acid copolymer, poly(meth)acrylic acid ester, styrene-butadiene copolymer, polyisoprene, styrene-isoprene copolymer, polybutadiene, acrylonitrile-butadiene copolymer, chloroprene copolymer, polyolefin, polystyrene, polyvinyl acetate, polyamide, ethylene-vinyl acetate copolymer, vinyl acetate-acrylic acid ester copolymer, and polyurethane.

Among these resin structures, those having a styrene-(meth)acrylic acid copolymer have a good affinity for the penetrating agent described later. Thus, the resin emulsion can form a film rapidly and sufficiently with the drying of the ink printed on the printing medium. Accordingly, the printed image can be provided with sufficient friction resistance and gloss to advantage.

The resin emulsion having the aforementioned styrene-(meth)acrylic acid copolymer (A) as a resin molecular skeleton to be incorporated in the ink for ink jet printing process of the invention has a sulfur-containing dispersibility-imparting group on the surface thereof. This can apply to the resin emulsion having a diene (co)polymer (B) as a resin molecular skeleton described later.

The sulfur-containing dispersibility-imparting group is not specifically limited so far as it is a functional group which contains sulfur atom and which imparts water dispersibility to the pigment. Preferred examples of the sulfur-containing dispersibility-imparting group include sulfinic acid ($-RSO_2^-$) and sulfonic acid ($-SO_3^-$) group.

In the resin emulsion having the aforementioned styrene-(meth)acrylic acid copolymer as a resin molecular skeleton for use in the ink for ink jet printing process of the invention, the aforementioned dispersibility-imparting group should be present at least on the surface of the particles, and it may also be present in the interior of the particles. This can apply also to the diene (co)polymer described later. The introduction of the aforementioned dispersibility-imparting group onto the surface of the resin emulsion can be accomplished by allowing the dispersibility-imparting group to be present in the monomer structure of the constituent resin or by adding a reagent containing the dispersibility-imparting group during the preparation of the resin emulsion. Alternatively, the preparation of the resin emulsion may be followed by graft polymerization to add the dispersibility-imparting group to the surface of the resin emulsion. By allowing the dispersibility-imparting group to be supported on the surface of the resin emulsion, the storage stability of the ink can be improved as mentioned above.

(B) Diene (Co)Polymer:

A diene (co)polymer exhibits a good affinity for the penetrating agent described later to advantage. When the resin emulsion having this resin structure is used, the resin emulsion can form a film rapidly and sufficiently with the drying of the ink printed on the printing medium. Therefore, the printed image can be provided with sufficient friction resistance and gloss. The resin emulsion will be further described hereinafter.

As the diene (co)polymer there may be used a compound obtained by substituting a diene (co)polymer or hydrogenation product thereof by a sulfur-containing dispersibility-imparting group. This compound can be obtained by substituting a diene (co)polymer comprising a diene monomer as an essential component (hereinafter also referred to as "base polymer") or hydrogenation product thereof by a sulfur-containing dispersibility-imparting group. The diene monomer to be incorporated in the base polymer is preferably a $C_4$–$C_{10}$ diene compound, more preferably a $C_4$–$C_8$ diene compound, even more preferably a $C_4$–$C_6$ diene compound.

Specific examples of the diene monomer include 1,3-butadiene, 1,2-butadiene, 1,2-pentadiene, 1,3-pentadiene, 2,3-pentadiene, isoprene, 1,2-hexadiene, 1,3-hexadiene, 1,4-hexadiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-deptadiene, 3,5-heptadiene, cyclopentadiene, dicyclopentadiene, ethylidenenorbornene, branched $C_4$–$C_7$ aliphatic diene, and branched $C_4$–$C_7$ alicyclic diene. These diene monomers may be used singly or in combination of two or more thereof.

Examples of other monomers which can be used in combination with the aforementioned diene monomer include aromatic monomers such as styrene, α-methylstyrene, o-methylstyrene, p-methylstyrene, m-methylstyrene and vinylnaphthalene, (meth)acrylic acid alkyl esters such as methyl (meth)acrylate, ethyl (meth)acrylate and butyl (meth)acrylate, monocarboxylic or dicarboxylic acids such as (meth)acrylic acid, crotonic acid, maleic acid, fumaric acid and itaconic acid, dicarboxylic anhydrides, vinyl cyanides such as (meth)acrylonitrile, and unsaturated compounds such as vinyl chloride, vinylidene chloride, vinyl methyl ethyl ketone, vinyl acetate, (meth)acrylamide and glycidyl (meth)acrylate. These monomers may be used singly or in combination of two or more thereof. In the case where these monomers are used, the amount of the diene monomer to be used is preferably not smaller than 0.5% by weight, more preferably not smaller than 1% by weight, particularly not smaller than 5% by weight.

The base polymer can be obtained by subjecting the diene monomer and optionally other monomers to (co)polymerization normally at a temperature of from −100° C. to 150° C., preferably from 0° C. to 130° C. in the presence of a radical polymerization initiator such as hydrogen peroxide, benzoyl peroxide and azobisisobutyronitrile or an anionic polymerization initiator such as n-butyl lithium, sodium naphthalene and metallic sodium optionally using a known solvent.

As the base polymer there may be used one obtained by hydrogenating a part or whole of the residual double bond based on the diene monomer of the base polymer as a precursor of the diene (co)polymer substituted by the sulfur-containing dispersibility-imparting group. In this case, a known hydrogenation catalyst may be used. A catalyst and method as described in Japanese Patent Laid-Open No. 1993-222115 may be employed. The base polymer thus hydrogenated may be substituted by the sulfur-containing dispersibility-imparting group by the method described later. Alternatively, the (co)polymer which has been substituted by the sulfur-containing dispersibility-imparting group may be hydrogenated.

The base polymer of the resin emulsion to be used in the ink for ink jet printing process of the invention may be in the form of either random or block copolymer without restriction. Preferred examples of the base polymer include isoprene homopolymer, butadiene hompolymer, isoprene-styrene random copolymer, isoprene-styrene block copolymer, styrene-isoprene-styrene ternary block copolymer, butadiene-styrene random copolymer, butadiene-styrene block copolymer, styrene-butadiene-styrene block copolymer, butadiene-styrene-butadiene ternary block copolymer, hydrogenation product of these (co)polymers, and ethylene-propylene-diene ternary copolymer.

The diene (co)polymer substituted by the sulfur-containing dispersibility-imparting group to be used in the ink for ink jet printing process of the invention can be obtained by processing the aforementioned base polymer by a known method as described in "Shinjikken Koza (New Institute of Experiment)", The Chemical Society of Japan, Vol. 14-III, page 1,773 and Japanese Patent Laid-Open No. 1990-227403. For example, in order to substitute the base polymer by a sulfonic acid group as a sulfur-containing dispersibility-imparting group, a sulfonating agent is used. In this case, the double bond moiety of the diene unit in the base polymer can be sulfonated. During the sulfonation, the hydrogen atom is substituted by the sulfonic acid (salt) while the double bond undergoes ring opening to form a single bond or is left closed. In the case where other monomers are used, the double bond moiety may be sulfonated not only in the diene unit portion but also in the aromatic unit. As the sulfonating agent to be used herein there is preferably used sulfuric anhydride, a complex of sulfuric anhydride with an electron-donating compound, sulfuric acid, chlorosulfonic acid, fuming sulfuric acid, hydrogensulfite (Na salt, K salt, Li salt, etc.) or the like.

Examples of the electron-donating compound include ethers such as N,N-dimethylformamide, dioxane, dibutyl ether, tetrahydrofurane and diethylether, amines such as pyridine, piperazine, trimethylamine, triethylamine and tributylamine, sulfides such as dimethyl sulfide and diethyl sulfide, and nitrile compounds such as acetonitrile, ethylnitrile and propylnitrile. Preferred among these electron-donating compounds are N,N-dimethylformamide and dioxane.

The amount of the sulfonating agent to be added during the substitution by the sulfur-containing dispersibility-imparting group is normally from 0.005 to 1.5 mols, preferably from 0.01 to 1.0 mol per mol of the total amount of the diene unit and aromatic unit in the base polymer. When the amount of the sulfonating agent to be added falls below 0.005 mols, the resulting resin emulsion cannot be provided with desired dispersion stability. On the contrary, when the amount of the sulfonating agent to be added exceeds 1.5 mols, a large amount of sulfuric anhydride is left unreacted and, even if neutralized with an alkali, produces a large amount of sulfate that lowers the purity of the resin emulsion.

For the sulfonation, a solvent inert to the sulfonating agent such as sulfuric anhydride may be used. Examples of such a solvent include halogenated hydrocarbons such as chloroform, dichloroethane, tetrachloroethane, tetrachloroethylene and dichloromethane, nitro compounds such as nitromethane and nitrobenzene, liquefied sulfur dioxide, aliphatic hydrocarbons such as propane, butane, pentane, hexane and cyclohexane, and ether-based solvents such as dioxane and tetrahydrofurane. Two or more of these solvents may be properly used in combination.

The sulfonation reaction temperature is normally from −70° C. to 200° C., preferably from −30° C. to 50° C. When the sulfonation reaction temperature falls below −70° C., the sulfonation reaction is retarded to economical disadvantage. On the contrary, when the sulfonation reaction temperature exceeds 200° C., a side reaction can occur to give a product which undergoes blackening or insolubilization.

The sulfur-containing dispersibility-imparting group-substituted diene (co)polymer thus synthesized is then used in the form of water emulsion (The emulsification process will be hereinafter referred also to as "re-emulsification"). For the re-emulsification, the organic solvent solution of the aforementioned substituted product or the unneutralized product is mixed with water or the additive, which can form a salt with the sulfur-containing dispersibility-imparting group, described below with stirring to undergo emulsification. The product thus emulsified is then freed of organic solvent leaving water behind. The re-emulsification can be accomplished by any ordinary method. This re-emulsification method is not specifically limited. Examples of the re-emulsification method employable herein include a method which comprises adding water to the organic solvent solution of the substituted product with stirring, a method which comprises adding the organic solvent solution of the substituted product to water with stirring, and a method which comprises adding water and the organic solvent solution of the substituted product at the same time with stirring.

Examples of the organic solvent to be used in the re-emulsification include aromatic solvents such as toluene and xylene, aliphatic solvents such as hexane and heptane, ketone solvents such as acetone and methyl ethyl ketone, ether solvents such as tetrahydrofurane and dioxane, ester solvents such as ethyl acetate and butyl acetate, and alcohol solvents such as methanol, ethanol and isopropyl alcohol. These solvents may be used singly or in combination of two or more thereof.

The re-emulsification may be effected also in the presence of a surface active agent. Examples of the surface active agent employable herein include nonionic surface active agents such as polyoxyethylene alkyl ether, polyoxysorbitane ester and polyoxyethylene alkylamine ether, anionic surface active agents such as oleate, laurate, rosinate, dodecylbenzenesulfonate and polyoxyethylene alkylether sulfuric acid ester, and cationic surface active agents such as octyltrimethylammonium bromide, dioctyldimethyl ammonium chloride and dodecylpyridinium chloride. These surface active agents may be used singly or in combination of two or more thereof. The aforementioned surface active agent may be used in the form of solution or dispersion in the aforementioned organic solvent solution of the substituted product or water.

The particulate resin in the resin emulsion to be incorporated in the ink for ink jet printing process of the invention is not specifically limited so far as it has a sulfur-containing dispersibility-imparting group on the surface thereof and preferably has the aforementioned resin structure (A) or (B). However, a resin emulsion having a lowest film-forming temperature of not higher than 30° C. is preferred. This is because when the lowest film-forming temperature of the resin emulsion falls within the above defined range, the necessity of subjecting the printed printing medium to heating or the like can be eliminated and the film formation of the printed surface of the printing medium can automatically proceed at room temperature or lower temperature, allowing the particulate pigment as colorant to be firmly fixed to the printing medium.

The term "lowest film-forming temperature" as used herein is meant to indicate the lowest temperature at which the resin emulsion dispersed in a liquid component such as water can form a transparent continuous film when the emulsion is spread over a plate of a metal, such as aluminum, to a small thickness and the ambient temperature rises. The resin emulsion dispersion stays in the form of white powder over a temperature range lower than the lowest film-forming temperature.

The term "film-forming properties" as used herein is meant to indicate that the resin emulsion forms a resin film when subjected to evaporation or osmosis to remove the liquid component, which is the continuous phase such as water, therefrom. By the formation of such a resin film, the pigment particles can be firmly fixed to each other or to the printing medium, making it possible to obtain a printed image excellent in friction resistance and gloss.

The resin emulsion to be incorporated in the ink for ink jet printing process of the invention is preferably added in an amount of from 10% to 200% by weight based on the amount of the pigment in the ink as calculated in terms of solid content. When the amount of the resin emulsion to be added falls below 10% by weight, the resulting printed image cannot be provided with desired friction resistance and gloss. On the contrary, when the amount of the resin emulsion to be added exceeds 200% by weight, the resulting ink exhibits too high a viscosity to be ejected from the printing head in a stable manner.

In order to cause the resin emulsion to be dispersed in the ink for ink jet printing process of the invention more stably, an additive which can form a salt with the sulfur-containing dispersibility-imparting group may be added to the ink. Specific examples of the additive employable herein include alkaline metal hydroxides such as sodium hydroxide, potassium hydroxide and lithium hydroxide, alkaline metal alkoxides such as sodium methoxide, sodium ethoxide, potassium methoxide, sodium t-butoxide and potassium t-butoxide, carbonates such as sodium carbonate, potassium carbonate and lithium carbonate, organic metal compounds such as methyl lithium, ethyl lithium, n-butyl lithium, sec-butyl lithium, amyl lithium and propyl sodium, amines such as aqueous ammonia, aminomethyl propanol, 2-aminoisopropanol, monoethanolamine, diethanolamine, triethanolamine, triisopropanolamine, trimethylamine, triethylamine, tripropylamine, tributylamine, pyridine, aniline, dimethylethanolamine and piperazine, and metal compounds such as sodium, lithium and potassium compounds. These additives may be used singly or in combination of two or more thereof.

<Penetrating Agent>

For the purpose of: enhancing the penetrating power of the ink; obtaining a printed image having a good friction resistance and gloss; and reducing blurring at the area where two or more color inks are imposed on each other or come in contact with each other upon full color printing, the ink for ink jet printing process of the invention may comprise at least one compound selected from the group consisting of acetylene glycol-based surface active agents, acetylene alcohol-based surface active agents, glycol ethers, 1,2-alkylene glycols and compounds having a structure represented by the following general formula (I):

$$R\text{—}EO_n\text{—}PO_m\text{—}X \qquad (I)$$

wherein R represents a $C_1$–$C_{12}$ alkyl group which may be straight-chain or branched; X represents —H or —$SO_3M$ (wherein M represents a counter ion such as hydrogen ion, alkaline metal ion, ammonium ion and organic ammonium ion); EO represents an ethyleneoxy group; PO represents a propyleneoxy group; and n and m each represent the number of the respective repeating units averaged over the entire system, with the proviso that EO and PO are intended to merely show the presence thereof in the molecule and hence their order of arrangement is not limited to that shown.

Specific preferred examples of the acetylene glycol-based surface active agent include compounds represented by the following general formula such as Surfynol TG, Surfynol 420, Surfynol 440, and Surfynol 465 (produced by Air Products and Chemicals, Inc.).

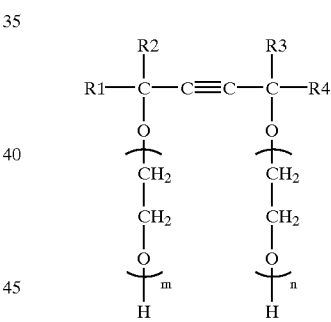

wherein R1, R2, R3 and R4 each independently represent an alkyl group; and the sum of n and m is from 0 to 30.

Examples of the acetylene alcohol-based surface active agent employable herein include 2,4-dimethyl-5-hexyne-3-ol, 2,4,7,9-tetramethyl-5-decyne-4,7-diol, 3,6-dimethyl-4-octyne-3,6-diol, and those obtained by adding ethyleneoxy groups and/or propyleneoxy groups to 2,4-dimethyl-5-hexyne-3-ol, 2,4,7,9-tetramethyl-5-decyne-4,7-diol or 3,6-dimethyl-4-octyne-3,6-diol by a number of not greater than 30 on the average. However, the invention is not limited to these compounds. A preferred example of the acetylene alcohol-based surface active agent is Surfynol 61 (produced by Air Products and Chemicals, Inc.).

The amount of the aforementioned surface active agent to be incorporated in the ink is preferably from 0.1 to 5% by weight. When the amount of the surface active agent to be incorporated in the ink falls below 0.1% by weight, the resulting ink exhibits an insufficient penetrating power and thus can cause blurring particularly at the area where two or more color inks are imposed on each other or come in contact with each other during full color printing. Further, the aforementioned resin emulsion undergoes insufficient film formation on the printing medium, occasionally making it impossible to provide the printed image with desired friction resistance and gloss. On the contrary, when the amount of the surface active agent to be incorporated in the ink exceeds 5% by weight, the resulting ink may wet the periphery of the nozzle of the printing head ununiformly, making it hard to attain stable ejection of the ink.

In the ink for ink jet printing process of the invention, as the penetrating agent there may be used a glycol ether singly or in combination with the aforementioned surface active agents besides the aforementioned acetylene glycol-based and acetylene alcohol-based surface active agents.

Specific examples of the glycol ether employable herein include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether.

Preferred examples of the 1,2-alkylene glycol include 1,2-pentanediol and 1,2-hexanediol.

The amount of the glycol ether and 1,2-alkylene glycol to be incorporated in the ink is preferably from 0 to 30% by weight. When the amount of the glycol ether and 1,2-alkylene glycol to be incorporated in the ink exceeds 30% by weight, the resulting ink may wet the periphery of the nozzle of the printing head ununiformly, making it hard to attain stable ejection of the ink.

The ink for ink jet printing process of the invention may contain, as the penetrating agent, a compound of general formula (I) shown below singly or in combination with the foregoing acetylene glycol-based surface active agent, acetylene alcohol-based surface active agent, glycol ether and 1,2-alkylene glycol.

$$R-EO_n-PO_m-X \quad (I)$$

wherein R represents a $C_1-C_{12}$ alkyl group which may be straight-chain or branched; X represents —H or —SO$_3$M (wherein M represents a counter ion such as hydrogen ion, alkaline metal ion, ammonium ion and organic ammonium ion); EO represents an ethyleneoxy group; PO represents a propyleneoxy group; and n and m each represent the number of the respective repeating units averaged over the entire system, with the proviso that EO and PO are intended to merely show the presence thereof in the molecule and hence their order of arrangement is not limited to that shown.

In formula (I), R is preferably a $C_{4-10}$ alkyl group. When the number of carbon atoms in R is 3 or less, the effect of improving penetrating property is reduced. Specifically, in formula (I), R is preferably $C_4$ (butyl), $C_5$ (pentyl), $C_6$ (hexyl), $C_7$ (heptyl), $C_8$ (octyl), $C_9$ (nonyl) or $C_{10}$ (decyl). In a further preferred embodiment, the number of carbon atoms in R is from 4 to 8, particularly preferably from 4 to 6. Although R may have either a straight-chain or branched structure, branched structures provide higher effect of improving penetrating property than straight-chain structures when comparing the former and latter at the same carbon number, and hence are preferred.

The alkaline metal ion represented by M, which may be included in X of formula (I), includes Li, Na and K. The organic ammonium ion represented by M is, for example, alkylammonium, alkanolammonium and specific examples thereof include menomethylammonium, diethylammonium, tripropylammonium, monoethanolammonium, diethanolammonium, triethanolammonium, monoisopropanolammonium, tripropanolammonium, N-isobutylalcoholammonium, N,N-dimethylethanolammonium and N,N-diethylethanolammonium. In the case where X is H, if the molecular weights of R and PO is high as compared to that of EO, the compound of formula (I) per se has an increased hydrophobicity to thereby tend to have a reduced solubility with respect to water. In the case where X is SO$_3$M, on the other hand, the solubility to water is readily available.

In formula (I), n is preferably in the range of from 0 to 10 and m is preferably in the range of from 1 to 5.

The compound of formula (I) preferably has a weight-average molecular weight of not higher than 2,000. If the weight-average molecular weight exceeds 2,000, the penetrating property-improving effect is reduced. The weight-average molecular weight is more preferably not higher than 1,000 and particularly preferably not higher than 500.

The amount of the compound represented by formula (I) to be incorporated in the ink of the invention is preferably from 0 to 15% by weight. When the amount exceeds 15% by weight, the resulting ink may wet the periphery of the nozzle of the printing head ununiformly, making it hard to attain stable ejection of the ink.

The ink to be used in the invention may comprise the aforementioned penetrating agents incorporated therein singly or in combination of two or more thereof.

The ink comprising the aforementioned penetrating agents incorporated therein exhibits good penetrating properties regardless of the kind of the printing medium and a good affinity for the aforementioned resin emulsion. Therefore, a sharp printed image which causes little blurring and exhibits an excellent friction resistance and gloss can be provided even during full-color printing.

<Other Additives>

The ink for ink jet printing process of the invention may comprise, as auxiliaries for the aforementioned penetrating agent, other anionic or nonionic surface active agents and hydrophilic high boiling low volatilizing solvents including high boiling low volatilizing polyvalent alcohols and mono-etherification, dietherification and esterification products thereof, singly or in combination of two or more thereof for the purpose of controlling the penetrating properties of the ink and improving the clogging prevention at the nozzle, the moisture retention of the ink and the solubility of the penetrating agent.

Examples of the nonionic surface active agent employable herein include fluorine-based copolymer, silicone-based copolymer, acrylic acid copolymer, polyoxyethylene alkyl ether, polyoxyethylene alkyl phenyl ether, polyoxyethylene binary alcohol ether, polyoxyethylene sterol ether, polyoxyethylene lauryl ether, polyoxyethylene lanoline derivative, ethylene oxide derivative of alkyl phenol formaline condensate, polyoxyethylene polyoxypropylene block copolymer, polyoxyethylene polyoxypropylene alkyl ether, aliphatic acid ester of polyoxyethylene compound, polyethylene oxide-condensed polyethylene glycol aliphatic acid ester, aliphatic acid monoglyceride, polyglycerin aliphatic acid ester, sorbitan aliphatic acid ester, propylene glycol aliphatic acid ester, sucrose aliphatic acid ester, aliphatic acid alkanolamide, polyoxyethylene aliphatic acid amide, polyoxyethylene alkylamine, and alkylamine oxide. The invention is not limited to these nonionic surface active agents.

Examples of the anionic surface active agents employable herein include higher aliphatic acid salt, higher alkyldicarboxylic acid salt, higher alcohol sulfate ester, higher alkylsulfonic acid salt, alkylbenzenesulfonic acid salt, alkylnaphthalenesulfonic acid salt, naphthalenesulfonic acid salt, formalin polycondensate, condensate of higher aliphatic acid with amino acid, dialkylsulfosuccinic acid ester, alkylsulfosuccinic acid salt, naphthenic acid salt, alkylethercarboxylic acid salt, acylated peptide, α-olefinesulfonic acid salt, N-acylmethyltaurin, alkylethersulfuric acid salt, secondary higher alcoholethoxysulfate, polyoxyethylene alkyl phenyl ether sulfuric acid sodium salt, polyoxyethylene alkyl phenyl ether sulfuric acid ammonium salt, monoglysulfate, alkylether phosphoric acid ester, and alkylphosphoric acid ester. However, the invention is not limited to these anionic surface active agents. The aforementioned salts are sodium, potassium or lithium salts.

Examples of the high boiling low volatilizing polyvalent alcohols employable herein include glycerin, ethylene glycol, diethylene glycol, triethylene glycol, propylene glycol, dipropylene glycol, hexylene glycol, polyethylene glycol, polypropylene glycol, 1,5-pentanediol, 1,2-hexanediol, monoetherification, dietherification or esterification product thereof, and examples of the hydrophilic high boiling low volatilizing solvent employable herein include nitrogen-containing organic solvent such as N-methyl-2-pyrrolidone, 1,3-dimethylimidazolidinone, monoethanolamine, N,N-dimethylethanolamine, N,N-diethylethanolamine, diethanolamine, N-n-butyldiethanolamine, triisopropanolamine and triethanolamine, and sulfur-containing organic solvent such as 2,2'-thiodiethanol.

The ink for ink jet printing process of the invention may comprise, in addition to a main solvent of water, a small amount of a high volatilizing monovalent alcohol, such as ethanol, propanol, isopropanol and butanol, for the purpose of improving the dryability thereof.

Further, the ink for ink jet printing process of the invention may comprise a pH buffer solution incorporated therein to adjust the pH value thereof to an optimum value. Examples of the pH buffer solution employable herein include potassium hydrogen phthalate, potassium dihydrogenphosphate, disodium hydrogenphosphate, sodium tetraborate, potassium hydrogen tartrate, sodium hydrogencarbonate, sodium carbonate, tris(hydroxymethyl) aminomethane, and tris(hydroxymethyl) aminomethane. The content of the pH buffer solution is preferably such that the pH value of the ink falls within a range of from about 7 to 10 from the standpoint of the durability of the head member and the stability of the ink.

Moreover, the ink for ink jet printing process of the invention may comprise other additives such as mildew-proofing agent, preservative and rust preventive (e.g., benzoic acid, dichlorophene, hexachlorophene, sorbic acid, p-hydroxybenzoic acid ester, ethylenediaminetetraacetic acid (EDTA), sodium dehydroacetate, 1,2-benzothiazoline-3-one, 3,4-isothiazoline-3-one) incorporated therein as necessary. Further, for the purpose of preventing the drying of the nozzle, the ink for ink jet printing process of the invention may comprise urea, thiourea, and/or ethyleneurea incorporated therein.

<Properties of Ink>

The various properties of the ink for ink jet printing process of the invention can be properly controlled. In a preferred embodiment, the viscosity of the ink is preferably not higher than 10 mPa·s (20° C.), more preferably not higher than 5 mPa·s (20° C.). The ink having a viscosity falling within this range can be ejected from the printing head in a stable manner. Further, the surface tension of the ink can be properly controlled. It is preferably from 25 to 50 mN/m (20° C.), more preferably from 30 to 40 mN/m (20° C.). The ink having a surface tension falling within this range (particularly the liquid component) can penetrate into the printing medium at a proper rate regardless of the kind of the printing medium. Therefore, a printed image having little blurring can be obtained during full-color printing. Further, a sharp printed image excellent in friction resistance and gloss can be realized.

EXAMPLES

The present invention will be illustrated in greater detail with reference to the following Examples, but the invention should not be construed as being limited thereto. The particulate pigment having a "sulfur-containing dispersibility-imparting group" on the surface thereof will be hereinafter referred simply to as "surface-treated pigment". All the "parts" and "%" as used hereinafter are given by weight unless otherwise specified.

Preparation examples of resin emulsions 1 to 6 to be used in the Examples will be described below.

<Preparation of Resin Emulsion 1>

900 g of ion-exchanged water and 4 g of sodium laurylsulfate were charged in a reaction vessel equipped with an agitator, a thermometer, a reflux condenser and a dropping funnel. The internal temperature of the reaction vessel was then kept to 70° C. while the air within was being replaced by nitrogen with stirring. 2 g of potassium persulfate as a polymerization initiator was added to and dissolved in the solution. Subsequently, a previously prepared emulsified product obtained by mixing, with stirring, 450 g of ion-exchanged water, 3 g of sodium laurylsulfate, 435 g of styrene, 475 g of butyl acrylate, 30 g of 2-acryloylamino-2-methylpropanesulfonate and 4 g of diethylene glycol dimethacrylate was then added dropwise into the reaction vessel at a constant rate over a period of 4 hours. After the termination of dropwise addition, the reaction solution was ripened for 3 hours.

The resin emulsion thus obtained was allowed to cool to ordinary temperature. To the resin emulsion were then added ion-exchanged water and sodium hydroxide to adjust the solid content and the pH value thereof to 35% by weight and 8, respectively. The resin emulsion was then filtered through a filter having a pore diameter of 0.4 μm.

The resin emulsion 1 thus obtained exhibited a lowest film-forming temperature of 20° C.

<Preparation of Resin Emulsion 2>

A resin emulsion 2 having a solid content of 35% by weight and a pH value of 8 was obtained in the same formulation and manner as in the resin emulsion 1 except that the amount of styrene and butyl acrylate used were changed to 545 g and 340 g, respectively.

The resin emulsion 2 thus obtained exhibited a lowest film-forming temperature of 30° C.

<Preparation of Resin Emulsion 3>

A resin emulsion 3 having a solid content of 35% by weight and a pH value of 8 was obtained in the same formulation and manner as in the resin emulsion 1 except that the amount of styrene and butyl acrylate used were changed to 350 g and 580 g, respectively.

The resin emulsion 3 thus obtained exhibited a lowest film-forming temperature of 10° C.

<Preparation of Resin Emulsion 4>

100 g of dioxane was charged in a glass reaction vessel. To the content of the glass reaction vessel was then added 11.8 g of sulfuric anhydride while the internal temperature of the reaction vessel was being kept to 25° C. The reaction mixture was then stirred for 2 hours to obtain a sulfuric anhydride-dioxane complex. Subsequently, the total amount of the complex thus obtained was added to a 15% THF solution of 100 g of a styrene-isoprene-styrene ternary block copolymer (weight ratio: 10/80/10, weight-average molecular weight: 100,000) while the internal temperature of the reaction vessel was being kept to 25° C. The reaction mixture was further stirred for 2 hours.

1,200 g of water, 7.1 g of sodium hydroxide and 1 g of sodium dodecylbenzenesulfonate were charged in a flask the internal temperature of which was then kept to 40° C. To the reaction mixture was then added dropwise the total amount of the solution obtained above over a period of 1 hour while the internal temperature of the flask was being kept to 40° C. After the termination of dropwise addition, the reaction mixture was stirred at a temperature of 40° C. for 2 hours, and then subjected to evaporation under reduced pressure so that the solvent was removed leaving water behind to obtain a sulfonated polymer emulsion having a concentration of 15% (resin emulsion 4). The emulsified product thus obtained had a particle diameter of 30 nm. The resin emulsion exhibited a lowest film-forming temperature of 20° C.

<Preparation of Resin Emulsion 5>

100 g of 1,2-dichloroethane was charged in a glass reaction vessel. To the content of the glass reaction vessel was then added 11.8 g of sulfuric anhydride while the internal temperature of the reaction vessel was being kept to 25° C. to obtain a 1,2-dichloroethane solution of sulfuric anhydride. Subsequently, the total amount of the sulfur anhydride solution thus obtained was added to a 15% 1,2-dichloroethane solution of 100 g of a butadiene-styrene-butadiene copolymer (weight ratio: 30/40/30, weight-average molecular weight: 50,000) while the internal temperature of the reaction vessel was being kept to 25° C. The reaction mixture was further stirred for 2 hours. After stirring, 1,2-dichloroethane was removed in an amount of about 500 g under reduced pressure. To the residue was then added 500 g of THF.

1,200 g of water, 7.1 g of sodium hydroxide and 1 g of sodium dodecylbenzenesulfonate were charged in a flask the internal temperature of which was then kept to 40° C. To the reaction mixture was then added dropwise the total amount of the solution obtained above over a period of 1 hour while the internal temperature of the flask was being kept to 40° C. After the termination of dropwise addition, the reaction mixture was stirred at a temperature of 40° C. for 2 hours, and then subjected to evaporation under reduced pressure so that the solvent was removed leaving water behind to obtain a sulfonated polymer emulsion having a concentration of 15% (resin emulsion 5). The emulsified product thus obtained had a particle diameter of 40 nm. The resin emulsion exhibited a lowest film-forming temperature of 30° C.

<Preparation of Resin Emulsion 6>

200 g of dioxane was charged in a glass reaction vessel. To the content of the glass reaction vessel was then added 23.6 g of sulfuric anhydride while the internal temperature of the reaction vessel was being kept to 25° C. The reaction mixture was then stirred for 2 hours to obtain a sulfuric anhydride-dioxane complex. Subsequently, the total amount of the complex thus obtained was added to a 15% THF solution of 100 g of a styrene-isoprene-styrene ternary block copolymer (weight ratio: 10/80/10, weight-average molecular weight: 100,000) while the internal temperature of the reaction vessel was being kept to 25° C. The reaction mixture was further stirred for 2 hours.

1,200 g of water, 7.1 g of sodium hydroxide and 1 g of sodium dodecylbenzenesulfonate were charged in a flask the internal temperature of which was then kept to 40° C. To the reaction mixture was then added dropwise the total amount of the solution obtained above over a period of 1 hour while the internal temperature of the flask was being kept to 40° C. After the termination of dropwise addition, the reaction mixture was stirred at a temperature of 40° C. for 2 hours, and then subjected to evaporation under reduced pressure so that the solvent was removed leaving water behind to obtain a sulfonated polymer emulsion having a concentration of 15% (resin emulsion 6). The emulsified product thus obtained had a particle diameter of 40 nm. The resin emulsion exhibited a lowest film-forming temperature of 15° C.

Example 1

Examples 1-1 and 1-2

(1) Preparation of Surface-Treated Pigment: Carbon Black 15 parts of carbon black ("MA-7", produced by Mitsubishi Chemical Corporation) were mixed with 200 parts of sulfolane. The mixture was then subjected to dispersion at a bead filling factor of 70% and a rotary speed of 5,000 rpm using a Type M250 Eiger motor mill (produced by Eiger Japan Co., Ltd.) for 1 hour. The mixture of dispersed pigment paste and solvent was transferred into an evaporator where it was then heated to a temperature of 120° C. under a pressure of not higher than 30 mmHg so that water in the system was distilled off as much as possible. The temperature of the reaction solution was then controlled to 150° C. Subsequently, to the reaction solution was added 25 parts of sulfur trisulfide. The reaction solution was then reacted for 6 hours. After the termination of reaction, the reaction solution was washed with excess sulfolane several times, poured into water, and then filtered to obtain a surface-treated carbon black dispersion.

(2) Determination of the Amount of Dispersibility-Imparting Group Incorporated

The surface-treated carbon black dispersion obtained in Example 1 (1) was treated by oxygen flask combustion method, absorbed to a 0.3% hydrogen peroxide solution, and then determined for sulfuric acid ion (divalent) by ion chromatography (Dionex Inc.; 2000i). The value thus measured was then reduced to sulfonic acid group basis. As a result, the amount of the dispersibility-imparting group incorporated was found to be $50 \times 10^{-6}$ equivalents per g of pigment.

(3) Preparation of Ink for Ink Jet Printing Process

In Example 1, there were used carbon black obtained in Example 1 (1), the resin emulsion 1 (Example 1-1) or the resin emulsion 4 (Example 1-2) as a resin emulsion and Surfynol 465 (produced by Air Products and Chemicals, Inc.), which is an acetylene glycol-based surface active agent, and triethylene glycol mono-n-butyl ether, which is a glycol ether, as penetrating agents. The formulation is shown in detail below.

| Surface-treated carbon black pigment of Example 1 (1) | 8.0% (as calculated in terms of solid content) |
|---|---|
| Resin emulsion 1 or 4 | 4.0% (as calculated in terms of solid content) |
| Surfynol 465 | 1.0% |
| Triethylene glycol mono-n-butyl ether | 10.0% |
| Glycerin | 15.0% |
| 1,5-Pentanediol | 2.5% |
| Triethanolamine | 5.0% |
| Ion-exchanged water | Balance |

The preparation of the ink was effected as follows.

To the surface-treated carbon black pigment obtained in Example 1 (1) were then added ion-exchanged water and triethanolamine. The mixture was then stirred to prepare a surface-treated carbon black pigment solution. Thereafter, to the surface-treated carbon black pigment solution thus prepared was gradually added with stirring a mixed solution of the resin emulsion 1 or 4, Surfynol 465, triethylene glycol mono-n-butyl ether, glycerin and 1,5-pentanediol mixed in a separate vessel to obtain black inks of Example 1 (Examples 1-1 and 1-2).

Example 2

Examples 2-1 and 2-2

In Example 2, black inks of Example 2 (Examples 2-1 and 2-2) were obtained in the same formulation and manner as in Example 1 except that as a resin emulsion there was used the aforementioned resin emulsion 2 (Example 2-1) or the aforementioned resin emulsion 5 (Example 2-2) instead of the resin emulsion 1 or 4.

Example 3

Examples 3-1 and 3-2

In Example 3, black inks of Example 3 (Examples 3-1 and 3-2) were obtained in the same formulation and manner as in Example 1 except that as a resin emulsion there was used the aforementioned resin emulsion 3 (Example 3-1) or the aforementioned resin emulsion 6 (Example 3-2) instead of the resin emulsion 1 or 4 and that the material (1) represented by the general formula (1) was used instead of Surfynol 465. In the material (1) represented by the general formula (1), R represents a neopentyl group, X represents a hydrogen atom, n represents 3.0, and m represents 1.5.

Example 4

Examples 4-1 and 4-2

(1) Preparation of Surface-Treated Pigment: C. I. Pigment Blue 15:3

20 parts of a phthalocyanine pigment (C. I. pigment blue 15:3) were mixed with 500 parts of quinoline. The mixture was then subjected to dispersion at a bead filling factor of 70% and a rotary speed of 5,000 rpm using a Type M250 Eiger motor mill (produced by Eiger Japan Co., Ltd.) for 2 hours. The mixture of dispersed pigment paste and solvent was transferred into an evaporator where it was then heated to a temperature of 120° C. under a pressure of not higher than 30 mmHg so that water in the system was distilled off as much as possible. The temperature of the reaction solution was then controlled to 160° C. Subsequently, to the reaction solution was added 20 parts of a sulfonated pyridine complex. The reaction solution was then reacted for 8 hours. After the termination of reaction, the reaction solution was washed with excess quinoline several times, poured into water, and then filtered to obtain a particulate surface-treated phthalocyanine blue pigment.

(2) Determination of the Amount of Dispersibility-Imparting Group Incorporated

The surface-treated phthalocyanine pigment dispersion obtained in Example 4 (1) was treated by oxygen flask combustion method, absorbed to a 0.3% hydrogen peroxide solution, and then determined for sulfuric acid ion (divalent) by ion chromatography (Dionex Inc.; 2000i). The value thus measured was then reduced to sulfonic acid group basis. As a result, the amount of the dispersibility-imparting group incorporated was found to be $58 \times 10^{-6}$ equivalents per g of pigment.

(3) Preparation of Ink for Ink Jet Printing Process

In Example 4, there were used the surface-treated phthalocyanine blue pigment prepared in Example 4 (1), the resin emulsion 1 (Example 4-1) or the resin emulsion 4 (Example 4-2) as a resin emulsion and Surfynol 465, which is an acetylene glycol, and diethylene glycol mono-n-butyl ether, which is a glycol ether, and 1,2-hexanediol, which is a 1,2-alkylene glycol, as penetrating agents. The formulation is shown in detail below.

| Surface-treated phthalocyanine blue pigment of Example 4 (1) | 6.0% (as calculated in terms of solid content) |
|---|---|
| Resin emulsion 1 or 4 | 1.5% (as calculated in terms of solid content) |
| Surfynol 465 | 0.8% |
| Diethylene glycol mono-n-butyl ether | 7.5% |
| Glycerin | 10.0% |
| 1,2-Hexanediol | 5.0% |
| Monoethanolamine | 2.0% |
| Trishydroxymethylaminomethane | 0.2% |
| Hexachlorophene | 0.03% |
| Ion-exchanged water | Balance |

The preparation of the ink was effected as follows.

To the surface-treated phthalocyanine blue pigment obtained in Example 4 (1) were then added ion-exchanged water and monoethanolamine. The mixture was then stirred to prepare a surface-treated phthalocyanine blue pigment solution. Thereafter, to the surface-treated phthalocyanine blue pigment solution thus prepared was gradually added with stirring a mixed solution of the resin emulsion 1 or 4, Surfynol 465, diethylene glycol mono-n-butyl ether, glycerin, 1,2-hexanediol, trishydroxymethyl aminomethane and hexachlorophene mixed in a separate vessel to obtain cyan inks of Example 4 (Examples 4-1 and 4-2).

Example 5

Examples 5-1 and 5-2

In Example 5, cyan inks of Example 5 (Examples 5-1 and 5-2) were obtained in the same formulation and manner as in Example 4 except that as a resin emulsion there was used the aforementioned resin emulsion 3 (Example 5-1) or the aforementioned resin emulsion 6 (Example 5-2) instead of the resin emulsion 1 or 4.

Example 6

Examples 6-1 and 6-2

(1) Preparation of Surface-Treated Pigment: C. I. Pigment Yellow 110

20 parts of an isoindolinone pigment (C. I. pigment yellow 110) were mixed with 500 parts of quinoline. The mixture was then subjected to dispersion at a bead filling factor of 70% and a rotary speed of 5,000 rpm using a Type M250 Eiger motor mill (produced by Eiger Japan Co., Ltd.) for 2 hours. The mixture of dispersed pigment paste and solvent was transferred into an evaporator where it was then heated to a temperature of 120° C. under a pressure of not higher than 30 mmHg so that water in the system was distilled off as much as possible. The temperature of the reaction solution was then controlled to 160° C. Subsequently, to the reaction solution was added 20 parts of a sulfonated pyridine complex. The reaction solution was then reacted for 4 hours. After the termination of reaction, the reaction solution was washed with excess quinoline several times, poured into water, and then filtered to obtain a particulate surface-treated isoindolinone pigment.

(2) Determination of the Amount of Dispersibility-Imparting Group Incorporated

The surface-treated isoindolinone pigment dispersion prepared in Example 6 (1) was treated by oxygen flask combustion method, absorbed to a 0.3% hydrogen peroxide solution, and then determined for sulfuric acid ion (divalent) by ion chromatography (Dionex Inc.; 2000i). The value thus measured was then reduced to sulfonic acid group basis. As a result, the amount of the dispersibility-imparting group incorporated was found to be $49 \times 10^{-6}$ equivalents per g of pigment.

(3) Preparation of Ink for Ink Jet Printing Process

In Example 6, there were used the particulate surface-treated isoindolinone pigment prepared in Example 6 (1), the resin emulsion 1 (Example 6-1) or the resin emulsion 4 (Example 6-2) as a resin emulsion and diethylene glycol mono-n-butyl ether, which is a glycol ether, as a penetrating agent. The formulation is shown in detail below.

| | |
|---|---|
| Surface-treated isoindolinone pigment of Example 6 (1) | 4.5% (as calculated in terms of solid content) |
| Resin emulsion 1 or 4 | 9.0% (as calculated in terms of solid content) |
| Diethylene glycol mono-n-butyl ether | 10.0% |
| Glycerin | 12.0% |
| Polyoxyethylene (EO = 8) nonyl phenyl ether | 0.2% |
| 1,5-Pentanediol | 5.0% |
| Propanol | 3.0% |
| 28% Aqueous ammonia | 2.3% |
| Urea | 3.0% |
| Ion-exchanged water | Balance |

The preparation of the ink was effected as follows.

To the surface-treated isoindolinone pigment obtained in Example 6 (1) were then added ion-exchanged water and ammonia. The mixture was then stirred to prepare a surface-treated isoindolinone pigment solution. Thereafter, to the surface-treated isoindolinone pigment solution thus prepared was gradually added with stirring a mixed solution of the resin emulsion 1 or 4, diethylene glycol mono-n-butyl ether, glycerin, polyoxyethylene (EO=8) nonyl phenyl ether, 1,5-pentanediol, propanol and urea mixed in a separate vessel to obtain yellow inks of Example 6 (Examples 6-1 and 6-2).

Example 7

Examples 7-1 and 7-2

In Example 7, yellow inks of Example 7 (Examples 7-1 and 7-2) were obtained in the same formulation and manner as in Example 6 except that as a resin emulsion there was used the aforementioned resin emulsion 3 (Example 7-1) or the aforementioned resin emulsion 6 (Example 7-2) instead of the resin emulsion 1 or 4.

Example 8

Examples 8-1 and 8-2

(1) Preparation of Surface-Treated Pigment: C. I. Pigment Red 122

20 parts of a dimethyl quinacridone pigment (C. I. pigment red 122) were mixed with 500 parts of quinoline. The mixture was then subjected to dispersion at a bead filling factor of 70% and a rotary speed of 5,000 rpm using a Type M250 Eiger motor mill (produced by Eiger Japan Co., Ltd.) for 2 hours. The mixture of dispersed pigment paste and solvent was transferred into an evaporator where it was then heated to a temperature of 120° C. under a pressure of not higher than 30 mmHg so that water in the system was distilled off as much as possible. The temperature of the reaction solution was then controlled to 160° C. Subsequently, to the reaction solution was added 20 parts of a sulfonated pyridine complex. The reaction solution was then reacted for 4 hours. After the termination of reaction, the reaction solution was washed with excess quinoline several times, poured into water, and then filtered to obtain a particulate surface-treated dimethyl quinacridone pigment. Example 8 (1) was the same as Example 6 (1) except that the isoindolinone pigment was replaced by a dimethyl quinacridone pigment (C. I. pigment red 122).

(2) Determination of the Amount of Dispersibility-Imparting Group Incorporated

The surface-treated dimethyl quinacridone pigment dispersion prepared in Example 8 (1) was treated by oxygen flask combustion method, absorbed to a 0.3% hydrogen peroxide solution, and then determined for sulfuric acid ion (divalent) by ion chromatography (Dionex Inc.; 2000i). The value thus measured was then reduced to sulfonic acid group basis. As a result, the amount of the dispersibility-imparting group incorporated was found to be $35 \times 10^{-6}$ equivalents per g of pigment.

(3) Preparation of Ink for Ink Jet Printing Process

In Example 8, there were used the particulate surface-treated dimethyl quinacridone pigment prepared in Example 8 (1), the resin emulsion 1 (Example 8-1) or the resin emulsion 4 (Example 8-2) as a resin emulsion and Surfynol 465, which is an acetylene glycol, as a penetrating agent. The formulation is shown in detail below.

| | |
|---|---|
| Surface-treated dimethyl quinacridone pigment of Example 8 (1) | 7.0% (as calculated in terms of solid content) |
| Resin emulsion 1 or 4 | 0.7% (as calculated in terms of solid content) |
| Surfynol 465 | 2.0% |
| Glycerin | 12.0% |
| Polyoxyethylene (EO = 8) nonyl phenyl ether | 0.2% |
| 1,5-Pentanediol | 5.0% |
| Propanol | 3.0% |
| 28% Aqueous ammonia | 0.4% |
| Urea | 3.0% |
| Ion-exchanged water | Balance |

The preparation of the ink was effected as follows.

To the surface-treated dimethyl quinacridone pigment prepared in Example 8 (1) were then added ion-exchanged water and ammonia. The mixture was then stirred to prepare a surface-treated dimethyl quinacridone pigment solution. Thereafter, to the surface-treated dimethyl quinacridone pigment solution thus prepared was gradually added with stirring a mixed solution of the resin emulsion 1 or 4, Surfynol 465, glycerin, polyoxyethylene (EO=8) nonyl phenyl ether, 1,5-pentanediol, propanol and urea mixed in a separate vessel to obtain magenta inks of Example 8 (Examples 8-1 and 8-2).

Example 9

Examples 9-1 and 9-2

In Example 9, magenta inks of Example 9 (Examples 9-1 and 9-2) were obtained in the same formulation and manner as in Example 8 except that as a resin emulsion there was used the aforementioned resin emulsion 3 (Example 9-1) or the aforementioned resin emulsion 6 (Example 9-2) and that the material (2) represented by the general formula (1) was used instead of polyoxyethylene (EO=8) nonyl phenyl ether. In the material. (2) represented by the general formula (1), R represents a n isobutyl group, X represents —$SO_3M$ (wherein M represents a potassium ion), and n and m each represent 3.0.

Comparative Example 1

A black ink of Comparative Example 1 was obtained in the same formulation and manner as in Example 1 except that the resin emulsions 1 and 4 were not added.

Comparative Example 2

A black ink of Comparative Example 2 was obtained in the same formulation and manner as in Example 1 except that as a resin emulsion there was used Joncryl Emulsion 780 (dispersion-providing group: carboxyl group; lowest film-forming temperature: not lower than 50° C.; produced by Johnson Polymer Co., Ltd.) instead of the resin emulsions 1 and 4.

Comparative Example 3

In Comparative Example 3, a cyan ink was prepared in the same formulation and manner as described in Japanese Patent Laid-Open No. 1998-110129.

Preparation of Ink for Ink Jet Printing Process
The formulation of the cyan ink is shown in detail below.

| | |
|---|---|
| Surface-treated phthalocyanine blue pigment of Example 4 (1) | 3.0% (as calculated in terms of solid content) |
| W-251 (produced by Nippon Polymer Co., Ltd.; dispersibility-imparting group: carboxyl group; solid content: 40%) | 0.2% |
| Emulgen 420 (nonionic surface active agent produced by Kao Corp.) | 1.0% |
| Diethylaminoethanol | 0.1% |
| Glycerin | 10.0% |
| Ethanol | 1.0% |
| 1,2-Benzothiazoline-3-one | 0.3% |
| Disodium ethylenediamine tetraacetate | 0.03% |
| Ion-exchanged water | Balance |

The preparation of the ink was effected as follows.

To the surface-treated phthalocyanine blue pigment obtained in Example 4 (1) were then added ion-exchanged water and diethylaminoethanol. The mixture was then stirred to prepare a surface-treated phthalocyanine blue pigment solution. Thereafter, to the surface-treated phthalocyanine blue pigment solution thus prepared was gradually added with stirring a mixed solution of W-251, Emulgen 420, glycerin, ethanol, 1,2-benzothiazoline-3-one and disodium ethylenediamine tetraacetate mixed in a separate vessel to obtain a cyan ink of Comparative Example 3.

Example 10

Examples 10-1 and 10-2

In Example 10, the black ink of Example 1, the cyan ink of Example 4, the yellow ink of Example 6 and the magenta ink of Example 8 were subjected to printing using the same printer as used in the evaluation of ink described later to print full-color images.

Comparative Example 4

In Comparative Example 4, the black ink of Example 1, the cyan ink of Comparative Example 3, the yellow ink of Example 6 and the magenta ink of Example 8 were subjected to printing using the same printer as used in the evaluation of ink described later to print full-color images.

<Evaluation of Ink>

The inks for ink jet printing process prepared in Examples 1 to 9 and Comparative Examples 1 to 3 were evaluated in the following manner.

Gloss of Printed Image

A Type MJ-5000C ink jet process printer (produced by SEIKO EPSON CO., LTD.) was loaded with each of the inks of Examples 1 to 9 and Comparative Examples 1 to 3 which were loaded deaerated in an ink pack beforehand. Using this printer, printing was made on dedicated glossy paper (produced by SEIKO EPSON CO., LTD.) and dedicated glossy paper (produced by SEIKO EPSON CO., LTD.). The printed image thus obtained was then visually evaluated for gloss. In Example 10 and Comparative Example 4, the aforementioned four color ink sets were used to print a full-color image. The printed image thus obtained was then evaluated. The criteria for evaluation are shown below. The results of the evaluation are set forth in Table 1.

- A: Uniform gloss over the entire image area
- B: Some roughness on full solid area of single color ink or of two or more color inks imposed on each other
- C: Some roughness on high density area of single color ink or of two or more color inks imposed on each other
- D: Remarkable roughness even on light-colored image area Friction Resistance of Printed Image Using the same printer and printing medium as used in the aforementioned evaluation of the gloss of printed image, the inks of Examples 1 to 9 and Comparative Examples 1 to 3 were printed. In Example 10 and Comparative Example 4, the aforementioned four color ink sets were used to print a full-color image. The printed image thus obtained was then evaluated. The printed image thus obtained was allowed to stand at room temperature for 10 minutes to evaluate the friction resistance thereof. For the evaluation of friction resistance, disturbance on the image caused when the printed image was rubbed with finger was visually confirmed. The criteria for the evaluation are shown below. The results of evaluation are set forth in Table 1.

- A: No disturbance observed
- B: Some disturbance observed on full solid area of single color ink or of two or more color inks imposed on each other
- C: Some disturbance observed on high density area of single color ink or of two or more color inks imposed on each other
- D: Remarkable disturbance observed even on light-colored area Blurring on Printed Image Using the same printer and printing medium as used in the aforementioned evaluation of the gloss of printed image, the inks of Examples 1 to 9 and Comparative Examples 1 to 3 were printed. In Example 10 and Comparative Example 4, the aforementioned four color ink sets were used to print a full-color image. The printed image thus obtained was then visually evaluated for blurring. The criteria for the evaluation are shown below. The results of evaluation are set forth in Table 1.

- A: No blurring observed
- B: Some blurring observed on full solid area of single color ink or two or more color inks imposed on each other
- C: Some blurring observed on high density area of single color ink or two or more color inks imposed on each other
- D: Remarkable blurring observed even on light-colored area Storage Stability of Ink The inks for ink jet printing process prepared in Examples 1-2 to 9-2 and Comparative Examples 1 to 3 were each put in a glass sample bottle which was then allowed to stand at a temperature of 70° C. for 2 weeks. These inks were each examined for occurrence of foreign matters and physical properties (viscosity, average particle diameter, surface tension) before and after storage. For the evaluation of the occurrence of foreign matters, the ink was filtered through a twilled filter having a mesh of 25 μm. Foreign matters left on the filter were then observed under microscope. For the evaluation of the physical properties, the aforementioned apparatus and measuring method were used. The criteria for the evaluation are shown in detail below. The results of evaluation are set forth in Table 1.

- A: Little or no occurrence of foreign matters and change of physical properties; good storage stability
- B: Some but slight occurrence of foreign matters or change of physical properties; practically acceptable level
- C: Some occurrence of foreign matters or change of physical properties, at least one of which is on a practically unacceptable level

| Example No. | Gloss | | Friction resistance | | Blurring | | Storage stability of ink |
| --- | --- | --- | --- | --- | --- | --- | --- |
| | Glossy paper | Glossy film | Glossy paper | Glossy film | Glossy paper | Glossy film | |
| Example 1-1 | A | A | A | A | A | A | A |
| Example 1-2 | A | A | A | A | A | A | A |
| Example 2-1 | B | B | B | B | A | A | A |
| Example 2-2 | B | B | B | B | A | A | A |
| Example 3-1 | A | A | A | A | A | A | A |
| Example 3-2 | A | A | A | A | A | A | A |
| Example 4-1 | A | A | A | A | A | A | A |
| Example 4-2 | A | A | A | A | A | A | A |
| Example 5-1 | A | A | A | A | A | A | A |

-continued

| Example No. | Gloss Glossy paper | Gloss Glossy film | Friction resistance Glossy paper | Friction resistance Glossy film | Blurring Glossy paper | Blurring Glossy film | Storage stability of ink |
|---|---|---|---|---|---|---|---|
| Example 5-2 | A | A | A | A | A | A | A |
| Example 6-1 | A | A | A | A | A | A | A |
| Example 6-2 | A | A | A | A | A | A | A |
| Example 7-1 | A | A | A | A | A | A | A |
| Example 7-2 | A | A | A | A | A | A | A |
| Example 8-1 | A | A | A | A | A | A | A |
| Example 8-2 | A | A | A | A | A | A | A |
| Example 9-1 | A | A | A | A | A | A | A |
| Example 9-2 | A | A | A | A | A | A | A |
| Example 10-1 | A | A | A | A | A | A | — |
| Example 10-2 | A | A | A | A | A | A | — |
| Comparative Example 1 | C | D | C | D | A | A | A |
| Comparative Example 2 | B | C | C | D | A | A | B |
| comparative Example 3 | C | C | C | D | B | B | C |
| Comparative Example 4 | C (cyan ink printed area) | C (cyan ink printed area) | C (cyan ink printed area) | D (cyan ink printed area) | D (cyan ink printed area) | D (cyan ink printed area) | — |

As can be seen in Table 1, the inks of Examples 1 to 9 and the full-color printing of Example 10 provided printed images having an excellent gloss and friction resistance and no blurring regardless of the kind of printing medium. On the contrary, Comparative Example 1 provided a printed image which became rough and showed disturbance in the evaluation of friction resistance. Comparative Example 2 provided a printed image which showed disturbance in the evaluation of friction resistance. Comparative Example 3 provided a printed image which became rough and showed disturbance in the evaluation of friction resistance. In the full-color printing of Comparative Example 4, the cyan ink-printed image area showed roughness and blurring and image disturbance in the evaluation of friction resistance.

The inks of Examples 1-1 to 9-2 showed little or no occurrence of foreign matters and change of physical properties and hence a good storage stability.

In accordance with the invention, the lack of gloss and friction resistance, which are problems of the related art, can be solved and a sharp image with little blurring can be obtained, even on a special printing medium such as glossy paper and glossy film, by printing an image on a printing medium using an ink comprising: a particulate pigment having a sulfur-containing dispersibility-imparting group on the surface thereof; a penetrating agent, such as glycol ether-based surface active agent and acetylene glycol-based surface active agent; and a resin emulsion comprising a dispersed particulate resin having a sulfur-containing dispersibility-imparting group on the surface thereof.

While the invention has been described in detail and with reference to specific embodiments thereof, it will be apparent to one skilled in the art that various changes and modifications can be made therein without departing from the spirit and scope thereof.

What is claimed is:

1. An ink for ink jet printing process, comprising at least:
   a particulate pigment having a sulfur-containing dispersibility-imparting group on the surface thereof;
   a penetrating agent;
   a resin emulsion comprising a dispersed particulate resin having a sulfur-containing dispersibility-imparting group on the surface thereof; and
   water.

2. The ink according to claim 1, wherein said resin constituting said resin emulsion has a styrene-(meth)acrylic acid copolymer skeleton.

3. The ink according to claim 1, wherein said resin constituting said resin emulsion has a diene (co)polymer skeleton.

4. The ink according to claim 1, wherein said particulate resin constituting said resin emulsion has at least one of —SO3M and —RSO2M wherein M represents a counter ion selected from the group consisting of hydrogen ion, alkaline metal ion, ammonium ion and organic ammonium ion chemically bonded to the surface thereof to render itself dispersible in water.

5. The ink according to claim 1, wherein said emulsion has a lowest film-making temperature of not higher than 30° C.

6. The ink according to claim 1, wherein said pigment comprises at least one of a carbon black pigment and an organic pigment.

7. The ink according to claim 1, wherein said particulate pigment has, through a surface treatment with a treating agent containing sulfur, at least one of —SO3M and —RSO2M wherein M represents a counter ion selected from the group consisting of hydrogen ion, alkaline metal ion, ammonium ion and organic ammonium ion chemically bonded to the surface thereof to render itself either or both dispersible and soluble in water.

8. The ink according to claim 1, wherein said penetrating agent comprises at least one compound selected from the group consisting of acetylene glycol-based surface active agents, acetylene alcohol-based surface active agents, glycol ethers, 1,2-alkylene glycols and compounds having a structure represented by the following general formula (I):

$$R\text{—}EO_n\text{—}PO_m\text{—}X \qquad (I)$$

wherein R represents a $C_1$–$C_{12}$ alkyl group which may be straight-chain or branched; X represents —H or —SO$_3$M wherein M represents a counter ion selected from the group consisting of hydrogen ion, alkaline metal ion, ammonium ion and organic ammonium ion; EO represents an ethyleneoxy group; PO represents a propyleneoxy group; and n and m each represent the number of the respective repeating units averaged over the entire system, with the proviso that EO and PO in general formula (I) merely show the presence thereof in the molecule and do not define their order of arrangement.

9. The ink according to claim 8, wherein said compound represented by general formula (I) has a weight-average molecular weight of not greater than 2,000.

10. The ink according to claim 8, wherein R in general formula (I) is a $C_4$–$C_{10}$ alkyl group.

11. A printed matter obtained by printing with an ink for ink jet printing process according to claim 1.

12. The ink according to claim 1, wherein the resin emulsion comprises a continuous phase formed by water as a liquid component and a dispersed phase formed by fine particles of the dispersed particulate resin which fine particles are substantially insoluble in the liquid component, the resin emulsion being stably dispersed in the ink.

13. The ink according to claim 12, which is formed by providing a mixture comprising the particulate pigment and water and thereafter adding the adding the resin emulsion and penetrating agent to the mixture.

14. The ink according to claim 12, wherein the pigment, penetrating agent, resin emulsion and water are present in the ink in respective amounts effective to provide a print formed with the ink with a more uniform gloss than a print formed with the ink in which the dispersed particulate resin has a carboxyl-containing dispersibility-imparting group instead of a sulfur-containing dispersibility-imparting group on the surface thereof.

* * * * *